United States Patent [19]

Glynn et al.

[11] Patent Number: 5,292,138
[45] Date of Patent: Mar. 8, 1994

[54] ROTOR TO ROTOR SPLIT RING SEAL

[75] Inventors: Christopher C. Glynn, Hamilton; Richard W. Albrecht, Fairfield; Robert J. Meade, West Chester; Stephen D. Abernathy, Cincinnati, all of Ohio

[73] Assignee: General Electric Company, Cincinnati, Ohio

[21] Appl. No.: 947,698

[22] Filed: Sep. 21, 1992

[51] Int. Cl.$^5$ .............................................. F16J 9/00
[52] U.S. Cl. ...................................... 277/173; 277/25; 277/144; 277/190; 415/230
[58] Field of Search ................. 277/25, 27, 173, 174, 277/175, 176, 83, 84, 117, 119, 138, 143, 144, 165, 190, 193, 197, 216, 223; 415/230, 231

[56] References Cited

U.S. PATENT DOCUMENTS

| | | | |
|---|---|---|---|
| 1,204,024 | 11/1916 | Johnson | 277/144 |
| 1,382,597 | 6/1921 | Goldberger | 277/144 |
| 2,080,579 | 5/1937 | Schaub | 277/144 |
| 3,160,416 | 12/1964 | Ryffel | 277/173 |
| 3,383,033 | 5/1968 | Moore | 230/132 |
| 3,423,070 | 1/1969 | Corrigan | 253/77 |
| 4,475,739 | 10/1984 | Nakajima et al. | 277/193 |
| 4,504,069 | 3/1985 | Stenlund | 277/174 |
| 4,526,387 | 2/1985 | Flower | 277/193 |
| 4,552,368 | 11/1985 | Wallace | 277/27 |
| 4,743,162 | 5/1988 | Pope | 415/170 R |
| 4,919,439 | 4/1990 | Williams | 277/27 |
| 5,085,521 | 2/1992 | Singh | 384/99 |

*Primary Examiner*—William A. Cuchlinski, Jr.
*Assistant Examiner*—Daniel G. DePumpo
*Attorney, Agent, or Firm*—Jerome C. Squillaro; Nathan D. Herkamp

[57] ABSTRACT

A split ring seal having an outer split ring and an inner split ring with the inner and outer split rings having overlapping portions. The split ring seal is located between a seating seal and a carrier and separates a high pressure cavity from a low pressure cavity. Movement of the split ring seal is restricted by sidewalls of the carrier. A diagonal edge on the outer ring reacts against centrifugal loading from the inner ring so that said outer ring is urged axially against a sidewall of the carrier to form a positive seal for blocking any leakage path between the high and low pressure cavities.

14 Claims, 3 Drawing Sheets

ROTOR TO ROTOR SPLIT RING SEAL

The present invention relates to turbomachinery such as gas turbines and to seals for such machinery and, more particularly, to a rotating seal between a pair of rotating annular shaft members which separates a high pressure cavity from a lower pressure cavity in a gas turbine engine.

BACKGROUND OF THE INVENTION

In turbomachinery and in many other mechanical applications, it is often required that fluid or air in a high pressure cavity be prevented from flowing into a lower pressure cavity. Various types of seals have been introduced for such a purpose. One type of seal utilizes the differential pressure between cavities to assist in seal seating. A loss of pressure may cause such seals to lose their effectiveness. This is particularly true in rotating machinery where centrifugal forces may cause the seal to bind if a sufficient pressure force is not present to provide proper seating of the seal. Thus, a need is seen for a differential pressure sealing means which is effective as a seal between rotating members even during times when the pressure force which enables proper sealing is reduced.

Typically, a piston ring having a diagonal split and generally referred to as a split ring is used for sealing in current state of the art differential pressure rotating seal applications when a sufficiently high pressure exists. The split allows the ring to grow radially under centrifugal forces. The piston ring seats on a low pressure side of its retention groove and an adequate seal is established. However, high centrifugal forces on the ring may cause the piston ring to bind against a radially outer rotating member and not seat due to the frictional force. A leakage path may therefore be formed around the piston ring.

The prior art schematic illustration of FIG. 1 shows a portion of a gas turbine engine having a split ring seal 2 situated between a rotating annular seal member 4 and core rotor 6. Both the seal member 4 and core rotor 6 rotate about an axis of rotation (not shown) of the engine. The split ring seal 2 (or piston ring) is situated to prevent high pressure air $P_2$ from leaking into the area of low pressure air $P_1$ and serves to mitigate the leakage of high pressure air in low pressure flowpath 8.

SUMMARY OF THE INVENTION

The present invention relates to a rotating sealing means for sealing a high pressure region from a low pressure region in a mechanical assembly. The sealing means is provided with a rotatable first annular member and a rotatable second annular member which is located radially inward from the first annular member. The second annular member has a circumferential groove defined by a pair of spaced flanges. A first one of the flanges borders the low pressure region and a second one of the flanges borders the high pressure region.

The sealing means further includes an outer split ring positioned in the defined groove. The high pressure region exerts a pressure force against the outer split ring which urges the outer split ring toward the first flange. During rotations, the outer split ring is urged against the first rotatable annular member by centrifugal force. In order to assure that the ring is urged into sealing engagement with the first flange, an inner ring is positioned in the groove with the outer ring. The outer ring has a radially inner corner beveled so as to provide a bearing surface for reacting against a radially outward directed force exerted on the outer ring by the inner ring as the inner ring is urged radially outward by centrifugal force. The beveled surface translates the outward force into an axially directed force for urging the outer ring into sealing engagement with the first flange.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

When referring to the drawings, it should be understood that like reference numerals designate identical or corresponding parts throughout the respective figures.

DETAILED DESCRIPTION OF THE INVENTION

Figure 1:
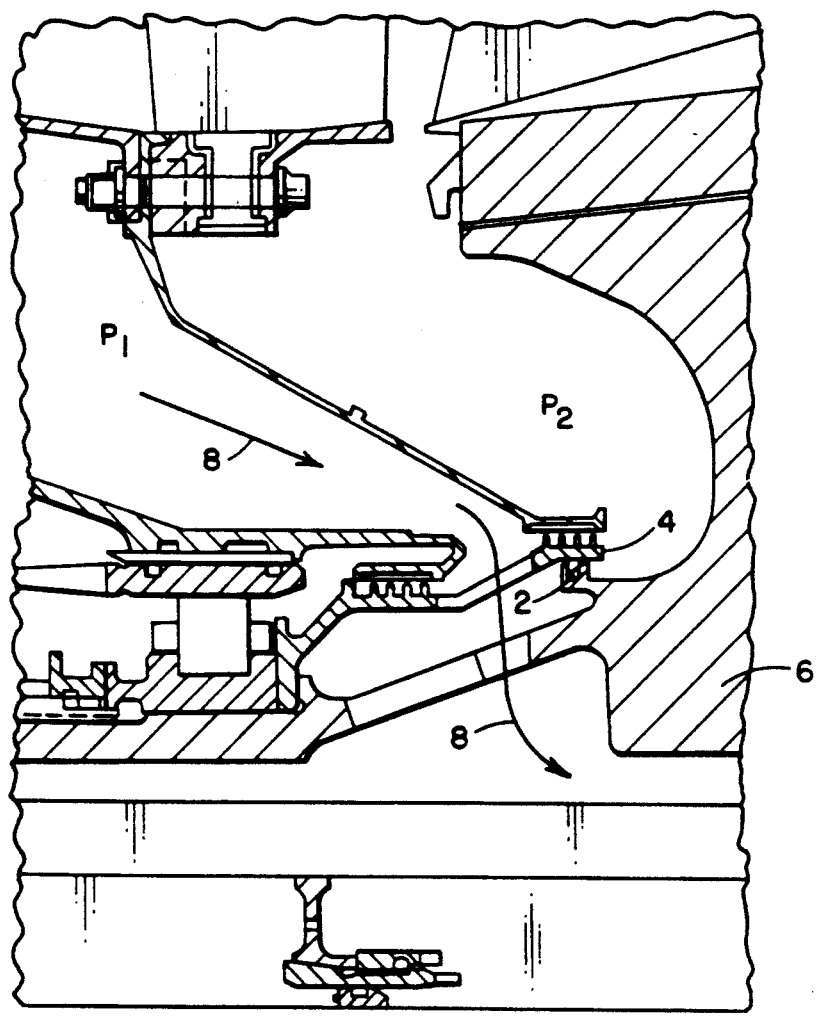
FIG. 1 is a prior art schematic illustration of a split ring seal.
Figure 2:
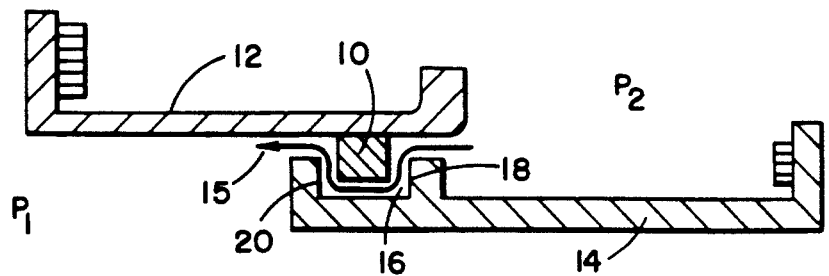
FIG. 2 is a schematic illustration of a prior art rotating split ring seal positioned between a rotating seating seal and carrier.

Referring to FIG. 2, there is shown a simplified representation of a split-ring seal arrangement characteristic of the prior art. The illustrative seal arrangement is of the type which might be used at the rotating interface between rotating seal member 4 and core rotor 6 of a gas turbine engine, as shown in FIG. 1, for separating an area of relatively high pressure fluid from an area of relatively low pressure fluid. Element 12 represents a seal seat corresponding to rotating seal member 4 while element 14 represents a seal carrier corresponding to the extension of rotor 6 adjacent rotating seal 4. A split ring 10 is positioned between seal seat 12 and carrier 14 and within a groove 16 defined by annular flanges 18 and 20 formed in carrier 14. A leakage path 15 extends from high pressure cavity $P_2$ to low pressure cavity $P_1$. The seal seat 12, carrier 14, and split ring 10 are annular in shape and rotate about an axis of rotation (not shown) of the gas turbine engine. The ring 10 floats within the groove 16 in carrier 14 defined by flanges 18 and 20 and expands under centrifugal force to seat against the radially inner surface of seal seat 12.

Figure 3:
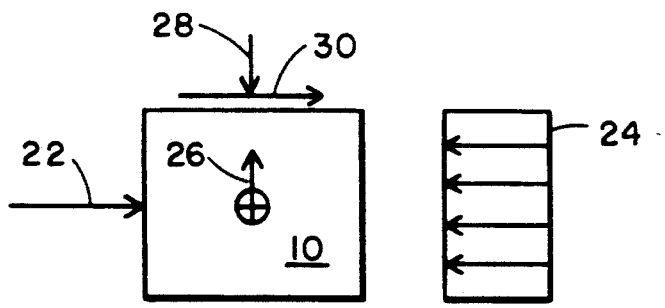
FIG. 3 is a force diagram for the rotating split ring seal of FIG. 2.

With reference to FIGS. 2 and 3, pressure force 24 from high pressure cavity $P_2$ exerts an axially directed force against split ring 10 which is reacted by seating reaction 22 as a result of split ring 10 being forced against flange 20. Centrifugal force 26 exerts a force which causes split ring 10 to come into contact with seal seat 12. The respective contacting surfaces of seal seat 12 and split ring 10, as a result of centrifugal force 26, cause a centrifugal reaction 28. Also, as a result of pressure force 24 urging split ring 10 toward flange 20, friction force 30 is created which reacts to impede the progress of split ring 10 toward the direction of flange 20. As those skilled in the art fully appreciate, the magnitude of friction force 30 is equal to the coefficient of friction existing between the contacting surfaces of the seal seat 12 and split ring 10 multiplied by centrifugal force 26, centrifugal force 26 being normal to the contacting surfaces of split ring 10 and seal seat 12 along an engine radius line (not shown), i.e., the force 26 coincides with an engine radius line. Since the gas turbine engine components must be rotating before pressures $P_1$ and $P_2$ are established, the friction force 30 is established before a significant pressure differential can be established. This friction force may affect the axial motion of split ring 10 and prevent establishing a seal between ring 10 and flange 20 thus creating the leakage flowpath 15.

Figure 4:
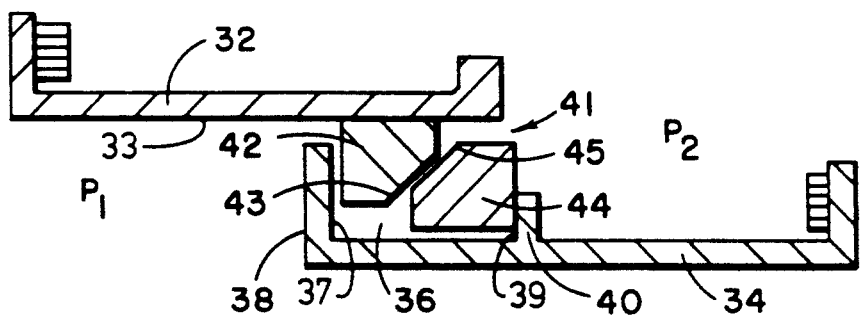
FIG. 4 is a schematic diagram of the two piece split ring seal of the present invention situated between a rotating seating seal and carrier.

FIG. 4 illustrates one form of the present invention in which a split ring assembly 41 is positioned between a seal seat 32 and a carrier 34. Carrier 34 includes axially forward and axially aft radially extending annular flanges 38 and 40 with inner sidewalls 37 and 39, respectively, which restrict the movement of split ring assembly 41. Carrier 34 and its flanges 38 and 40 form an annular groove 36 for restraining split ring assembly 41. As is appreciated with reference to FIG. 4, split ring assembly 41 is comprised of an outer split ring 42 and an inner split ring 44. The rings have a preselected overlapping portion along a mating interface. The axial spacing, i.e., the spacing between annular flanges 38 and 40 along an axis of the engine and normal to the line of force 26, is less than the combined axial dimensions of the rings 42 and 44 to maintain the preselected overlap.

When seen from a cross-sectional side view as in FIG. 4, outer split ring 42 and inner split ring 44 appear substantially rectangular in shape and extend circumferentially around a rotating axis (not shown). However, at least the overlapping portions of outer split ring 42 and inner ring 44 have diagonal, angular or beveled edges 43 and 45 respectively. Diagonal edge 43 and diagonal edge 45 form a wedge angle which is depicted as being approximately 45° in FIG. 4. The purpose of this wedge angle is more fully appreciated with reference to FIG. 5.

Figure 5:
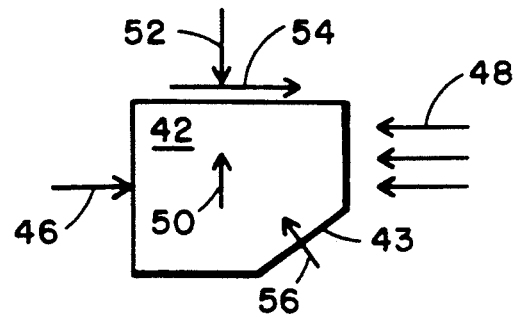
FIG. 5 is a force diagram for the outer split ring of the two piece ring seal of FIG. 4.

With reference to both FIGS. 4 and 5, pressure force 48 originating from high pressure side $P_2$ exerts a force against outer split ring 42 such that outer split ring 42 is urged toward the inner sidewall 37 of flange 38 of carrier 34 creating seating reaction force 46. Centrifugal force 50 causes outer split ring 42 to be urged against radially inner seal surface 33 of seal seat 32 thereby creating centrifugal reaction 52. Friction force 54 opposes the movement of outer split ring 42 toward flange 38. Centrifugal reaction force 50 also acts on inner split ring 44 driving it outward until surface 45 abuts surface 43.

A reaction 56 from the inner split ring 44 is comprised of a force which has a direction component which pushes outer ring seal 42 toward flange 38 and also toward seal seat 32. Another component of reaction force 56 drives inner split ring 44 toward flange 40 of carrier 34 (FIG. 4). Thus, as a result of the geometry of diagonal edges 43 and 45, an effective seal is achieved which minimizes any leakage path forming between the high and low pressures sides ($P_1$ and $P_2$) through split ring assembly 41, i.e., ring 42 seals against seat 32 and carrier flange 38 while ring 44 seals against ring 42 and carrier flange 40. More particularly, the centrifugal force corresponding to force 50 acting on inner ring 44 is utilized to drive the outer ring 42 into a sealing position against an inner sidewall of flange 38 while simultaneously urging ring 44 against an inner sidewall of flange 40 by virtue of the force created at the diagonal faces 43 and 45.

The split ring seal of the present invention is applicable in situations where the pressure force, such as pressure force 48 of FIG. 5, is inadequate to achieve proper seating. Testing of the invention has revealed significantly lower leakage rates. Further-more, by adjusting the wedge angle between diagonal edges 43 and 45, the reactionary forces can be adjusted to be consistent with desired parameters.

Figure 6:
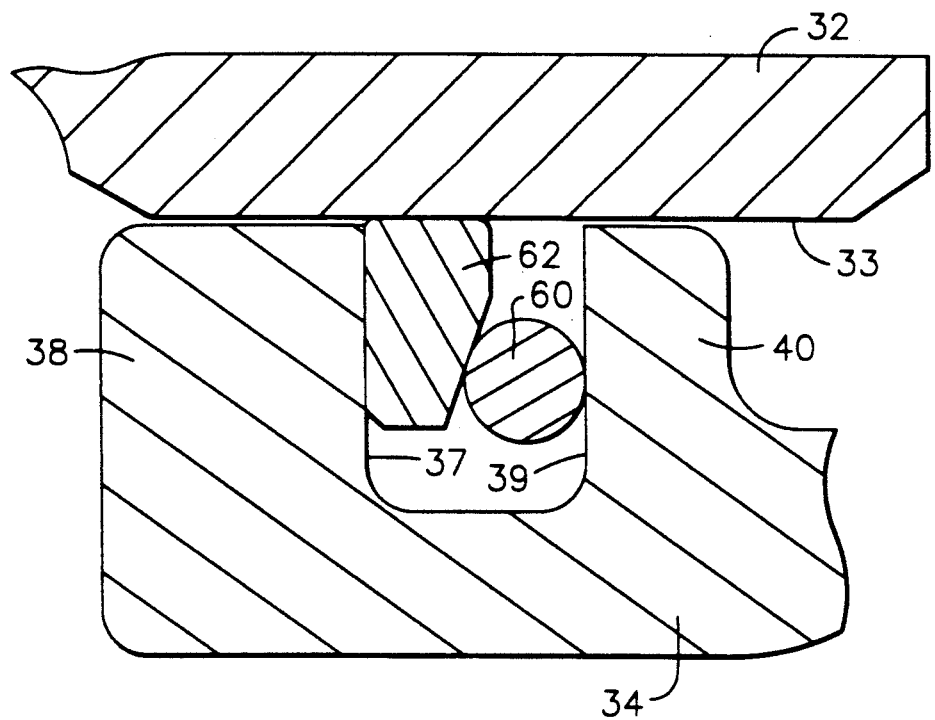
FIG. 6 is a schematic diagram of the two-piece split ring seal of the present invention in another form.

Another form of the present invention is shown in FIG. 6. In this embodiment, the inner split ring 44 is replaced with a split ring 60 having a circular cross section. The response of the assembly of FIG. 6, when subjected to rotating inertial forces, is the same as was described with reference to FIG. 4 in that both the outer ring 62 (equivalent to ring 42) and the inner ring 60 are forced radially outward until the ring 62 loads against the outer seal seat 32. However, in FIG. 4, a reaction was required between essentially mating beveled surfaces on each split ring 42 and 44 so that the application of the axial load is dependent upon the angular tolerance between the interfacing beveled surfaces 43 and 45. In contrast, the circular cross section of split ring 60 provides a determinant location for the application of the axial load imposed on the beveled surface of the radially outer split ring 62. Furthermore, the angle of the bevel on ring 62 can be steeper, with respect to the axial direction, so that resolution of the force generated by split ring 60 results in a larger axially directed component.

In summary, the present invention comprises an improved split-ring seal assembly for use in a rotating interface of a gas turbine engine for separating an area of relatively high pressure fluid $P_2$ from an area of relatively low pressure fluid $P_1$. The seal assembly is subjected to a centrifugal force 26 caused by rotation of the assembly during engine operation. The seal assembly comprises an annular seal seat 32 having a radially inner seal surface. An annular seal carrier 34 is positioned radially inward of seal seat 32 and aligned with seat 32. The carrier 34 has axially forward and axially aft annular flanges 38 and 40 with inner seal sidewalls. A split ring assembly 41 has a radially outer ring member 42 or 62 for seating against seal seat 32 and a radially inner ring member 44 or 60 for urging the outer member 42 axially forward into sealing engagement with the inner sidewall of the axially forward flange 38. The inner ring member is axially displaced with respect to the outer ring member with preselected overlapping portions. In one form, a radially inner edge 43 of the outer ring member 42 and a radially outer edge 45 of the inner ring member 44 are each formed with mating angular surfaces at the overlapping portions for transferring at least a portion of the radially directed centrifugal force on the inner ring member 44, corresponding to force 50 on ring member 42, into an axially forward force on the outer ring member 42, the portion of such force comprising a vector component of force 56. The inner seal sidewalls of flanges 38 and 40 are axially spaced apart a distance less than the combined axial dimension of the inner and outer ring members 42 and 44 whereby axially aft displacement of inner ring member 44 is restricted by the inner sidewall of the axially aft flange 40. Engagement between the angular surfaces 43 and 45 of inner and outer ring members 42 and 44 forces inner ring member 44 into sealing engagement with the inner sidewall of axially aft flange 40. Preferably, the angular surfaces 43, 45 are formed at about 45 degrees with respect to a radius line or force direction line 26 of the engine. As is apparent, the diagonal edge or angular surface 43 of outer ring member 42 faces generally radially inward and the diagonal edge or angular surface 45 of inner ring member 44 faces generally radially outward toward the diagonal edge or angular surface 43 of outer ring member 42. In another form, an inner split ring 60 has a circular cross section which reacts against a beveled, radially inner corner of an outer split ring 62. The circular split ring 60 provides a more determinant location for application of force between the rings.

The foregoing detailed description is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. An improved split-ring seal assembly for use in a rotating interface of a gas turbine engine for separating an area of relatively high pressure fluid from an area of relatively low pressure fluid, the seal assembly being subjected to a centrifugal force during rotation thereof and comprising:

an annular seal seat having a radially inner seal surface;

an annular seal carrier positioned radially inward of said seal seat and aligned therewith, said carrier having axially forward and axially aft annular flanges with inner seal sidewalls; and a split ring assembly having a radially outer split ring member for seating against said seal seat and a radially inner ring member for urging said outer member axially forward into sealing engagement with said inner sidewall of said axially forward flange, said inner ring member being axially displaced with respect to said outer ring member with preselected overlapping portions, a radially inner edge of said outer ring member being formed with an angular surface at said over-lapping portion for transferring at least a portion of a radially directed centrifugal force on said inner ring member into an axially forward force on said outer ring member.

2. The seal assembly of claim 1 wherein said inner seal sidewalls are axially spaced apart a distance less than the combined axial dimension of said inner and outer ring members whereby axially aft displacement of said inner ring member is restricted by said inner sidewall of said axially aft flange.

3. The seal assembly of claim 2 wherein said inner split ring member has a circular cross section.

4. The seal assembly of claim 2 wherein said radially inner split ring member has a generally rectangular cross section with a radially outer corner beveled for mating with said angular surface on said outer split ring member.

5. The seal assembly of claim 4 wherein engagement between said angular surfaces of said inner and outer ring members force said inner ring member into sealing engagement with said axially aft inner sidewall.

6. The seal assembly of claim 5 wherein said angular surfaces are formed at about 45 degrees with respect to a radius line of the engine.

7. A sealing means for sealing a high pressure region from a low pressure region in a rotating mechanical assembly, said sealing means comprising:

a rotatable first annular member;

a rotatable second annular member located radially inward from the first annular member, said second annular member having a first sidewall and a second sidewall, the first sidewall bordering the low pressure region and the second sidewall bordering the high pressure region;

an outer split ring circumscribing said second annular member between said first and second sidewalls, said outer ring member having a diagonal edge, the high pressure region exerting a pressure force against said outer split ring which urges said outer split ring toward said first sidewall, said outer split ring being urged against said first rotatable annular member by a centrifugal force;

an inner split ring which makes contact with the second sidewall, said inner split ring having a diagonal edge which reacts with and slidingly engages said diagonal edge of said outer split ring; and said inner split ring and said outer split ring reacting against each other at said diagonal edge for urging said rings into engagement with said first and second sidewalls, respectively.

8. A sealing means according to claim 7 wherein said first rotatable annular member is a seal seat.

9. A sealing means according to claim 8 wherein said second rotatable annular member is a seal carrier.

10. A sealing means according to claim 9 wherein the mechanical apparatus is a gas turbine engine.

11. The sealing means of claim 7 wherein said diagonal edge of said outer ring member faces generally radially inward and said diagonal edge of said inner split ring member faces said diagonal edge of said outer split ring member.

12. The sealing means of claim 11 wherein said inner split ring member is driven into abutment with said outer split ring member by centrifugal reaction.

13. A sealing means according to claim 7, wherein said inner and outer split rings are free floating.

14. A sealing means for sealing a high pressure region from a low pressure region in a rotating mechanical assembly, said sealing means comprising:

a rotatable first annular member;

a rotatable second annular member located radially inward from the first annular member, said second annular member having a first sidewall and a second sidewall, the first sidewall bordering the low pressure region and the second sidewall bordering the high pressure region;

an outer split ring circumscribing said second annular member between said first and second sidewalls, said outer ring member having a diagonal edge, the high pressure region exerting a pressure force against said outer split ring which urges said outer split ring toward said first sidewall, said outer split ring being urged against said first rotatable annular member by a centrifugal force;

an inner split ring having a circular cross section, said inner split ring being at least partially axially displaced from said outer split ring such that centrifugal force drives said inner split ring into contact with said diagonal edge of said outer split ring for urging said outer split ring toward said first sidewall.

* * * * *